(12) United States Patent
Jawale et al.

(10) Patent No.: US 11,403,596 B2
(45) Date of Patent: Aug. 2, 2022

(54) INTEGRATED FRAMEWORK FOR MANAGING HUMAN INTERACTIONS

(71) Applicant: RAMMER TECHNOLOGIES, INC., San Jose, CA (US)

(72) Inventors: Toshish Jawale, Seattle, WA (US); Surbhi Rathore, Seattle, WA (US)

(73) Assignee: RAMMER TECHNOLOGIES, INC., San Jose, CA (US)

( * ) Notice: Subject to any disclaimer, the term of this patent is extended or adjusted under 35 U.S.C. 154(b) by 281 days.

(21) Appl. No.: 16/659,662

(22) Filed: Oct. 22, 2019

(65) Prior Publication Data
US 2020/0126042 A1    Apr. 23, 2020

(51) Int. Cl.
*G06Q 10/10* (2012.01)
*G06F 40/30* (2020.01)
*H04L 51/216* (2022.01)
(52) U.S. Cl.
CPC ........... *G06Q 10/105* (2013.01); *G06F 40/30* (2020.01); *H04L 51/216* (2022.05)
(58) Field of Classification Search
None
See application file for complete search history.

(56) References Cited

U.S. PATENT DOCUMENTS

| | | | | |
|---|---|---|---|---|
| 4,974,191 A | * | 11/1990 | Amirghodsi | G06F 40/30 704/8 |
| 5,263,127 A | * | 11/1993 | Barabash | G06N 5/047 706/48 |
| 5,333,275 A | * | 7/1994 | Wheatley | G10L 15/18 704/231 |
| 9,635,178 B2 | | 4/2017 | Raanani et al. | |
| 2003/0163311 A1 | * | 8/2003 | Gong | G10L 13/027 704/250 |

(Continued)

FOREIGN PATENT DOCUMENTS

CA    2443337 C  *  7/2008  ........ H04M 3/42153

OTHER PUBLICATIONS

Hashmi "Said-Huntington Discourse Analyzer: A machine-learning tool for classifying and analyzing discourse" (2012) (https://dspace.mit.edu/bitstream/handle/1721.1/98543/920475068-MIT.pdf?sequence=1) (Year: 2012).*

*Primary Examiner* — Sujay Koneru
(74) *Attorney, Agent, or Firm* — Chip Law Group

(57) ABSTRACT

Systems and method for managing human interactions is described. An integrated system may receive dataset from multiple disparate sources. The received dataset may be processed by corresponding data processing engines and transformed into textual dataset by respective adapters in the integrated system. The textual dataset may be further processed and transformed into unified dataset by components in integrated system. For instance, such processing may include analysis based on comprehension, context of the interaction, etc. Based on further analysis, the unified dataset may be classified and highlighted into items that may correspond to action items, follow ups, questions or any other important information, insights provided or regenerated based on an analysis from the human interactions. Further insights provided based on the analysis may correspond to outcomes in response to the processing and analysis by the components in integrated system.

22 Claims, 7 Drawing Sheets

(56) References Cited

U.S. PATENT DOCUMENTS

| | | | |
|---|---|---|---|
| 2004/0015869 A1* | 1/2004 | Herriot | G06Q 10/10 717/126 |
| 2006/0080107 A1* | 4/2006 | Hill | G10L 15/22 704/275 |
| 2008/0243772 A1* | 10/2008 | Fuxman | G06F 40/151 |
| 2009/0326924 A1* | 12/2009 | Crider | G06F 40/30 704/9 |
| 2012/0221502 A1* | 8/2012 | Jerram | G06Q 30/0256 706/46 |
| 2013/0054512 A1* | 2/2013 | Ephrat | G16H 20/10 707/602 |
| 2014/0207723 A1* | 7/2014 | Alboszta | B82Y 10/00 706/46 |
| 2014/0359421 A1* | 12/2014 | Allen | G06F 40/169 715/230 |
| 2017/0032262 A1* | 2/2017 | Gerken | G06N 5/048 |
| 2017/0187880 A1 | 6/2017 | Raanani et al. | |
| 2017/0200081 A1* | 7/2017 | Allen | G06F 40/205 |
| 2017/0339274 A1* | 11/2017 | Odinak | H04M 3/5183 |
| 2018/0046710 A1 | 2/2018 | Raanani et al. | |
| 2018/0077286 A1 | 3/2018 | Raanani et al. | |
| 2018/0096271 A1 | 4/2018 | Raanani et al. | |
| 2018/0113867 A1* | 4/2018 | Erpenbach | G06F 40/10 |
| 2018/0122383 A1* | 5/2018 | Raanani | H04M 3/5175 |
| 2018/0181561 A1 | 6/2018 | Raanani et al. | |
| 2018/0183930 A1 | 6/2018 | Raanani et al. | |
| 2018/0218733 A1* | 8/2018 | Raanani | G10L 15/22 |
| 2019/0042548 A1* | 2/2019 | Peoples | G06N 7/005 |
| 2019/0122661 A1* | 4/2019 | Hansen | G10L 15/22 |
| 2019/0130904 A1* | 5/2019 | Homma | G10L 15/18 |
| 2019/0251169 A1* | 8/2019 | Loghmani | G06F 40/295 |
| 2020/0007380 A1* | 1/2020 | Chen | H04L 51/02 |
| 2020/0126042 A1* | 4/2020 | Jawale | G06F 40/30 |

\* cited by examiner

INTEGRATED FRAMEWORK FOR MANAGING HUMAN INTERACTIONS

CROSS REFERENCE TO RELATED APPLICATIONS/INCORPORATION BY REFERENCE

This application claims the priority benefit of Indian Provisional Patent Application No. 201821039833, filed on Oct. 22, 2018. The entirety of the above-mentioned patent application is hereby incorporated by reference and made a part of this specification.

FIELD

Various embodiments of the disclosure relate to control of human interaction. More specifically, various embodiments of the disclosure relate to an integrated framework for managing human interactions.

BACKGROUND

Human interactions have played a significant role in the history of human evolution. Such interactions may be formal (e.g., business interactions) or informal (e.g., casual conversations). In a formal business setting, business interactions may be managed and tracked by summarizing and preparing Minutes of Meeting (MoM), identifying and tracking work items that may necessitate human effort or human involvement. In such a scenario, expending human efforts for managing such tasks may be inefficient, redundant and the information assimilated therein, may be inconsistent and inaccurate. Further, comprehension of the contexts of the business interactions may be challenging, due to multiple factors including limited information processing capabilities of humans. For example, such comprehension challenges may be, when the context of the business interactions are very technical in nature and/or happen over an extended period of time; include multiple topics and conclusions.

The limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and a method for an integrated framework for managing human interactions.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in an integrated framework for managing human interactions are described herein. Exemplary aspects of the disclosure may comprise of a method to manage human interactions via an integrated framework. In accordance with an embodiment, the integrated framework may implement suitable logic, interfaces, engines and/or adapters, one or more circuitries and/or code executable by the circuitries. For example, the one or more circuitries may be configured to execute specific functionalities or operations in the integrated framework. The one or more circuitries may be configured to receive and process data from multiple data sources. Such multiple sources of data may include pre-recorded or stored audio streams, pre-recorded or stored video streams, real time audio stream, real time video stream, and/or other real time data streams, information or content of which is collectively referred to as data or dataset. Such data may include identifiers and/or metadata information that may be used for further processing and analysis by one or more corresponding circuitries in the integrated framework. The one or more circuitries in the integrated framework may be configured to transform the processed data into a unified dataset. For example, such unified dataset may include one or more conversations including one or more contexts from one or more participants. The one or more circuitries may stream, transmit or send the unified dataset for further processing and analysis in the integrated framework. The one or more circuitries in the integrated framework may be configured to determine the one or more contexts of the one or more conversations from the unified dataset. The one or more circuitries in the integrated framework may be configured to determine one or more conflicts in the one or more conversations from the unified dataset. The one or more circuitries in the integrated framework may be configured to determine one or more conflict resolutions for the determined one or more conflicts in the one or more conversations. The one or more circuitries may manage the human interactions based on the determined contexts, the determined conflicts and the determined conflict resolutions, the one or more circuitries in the integrated framework.

Figure 1:
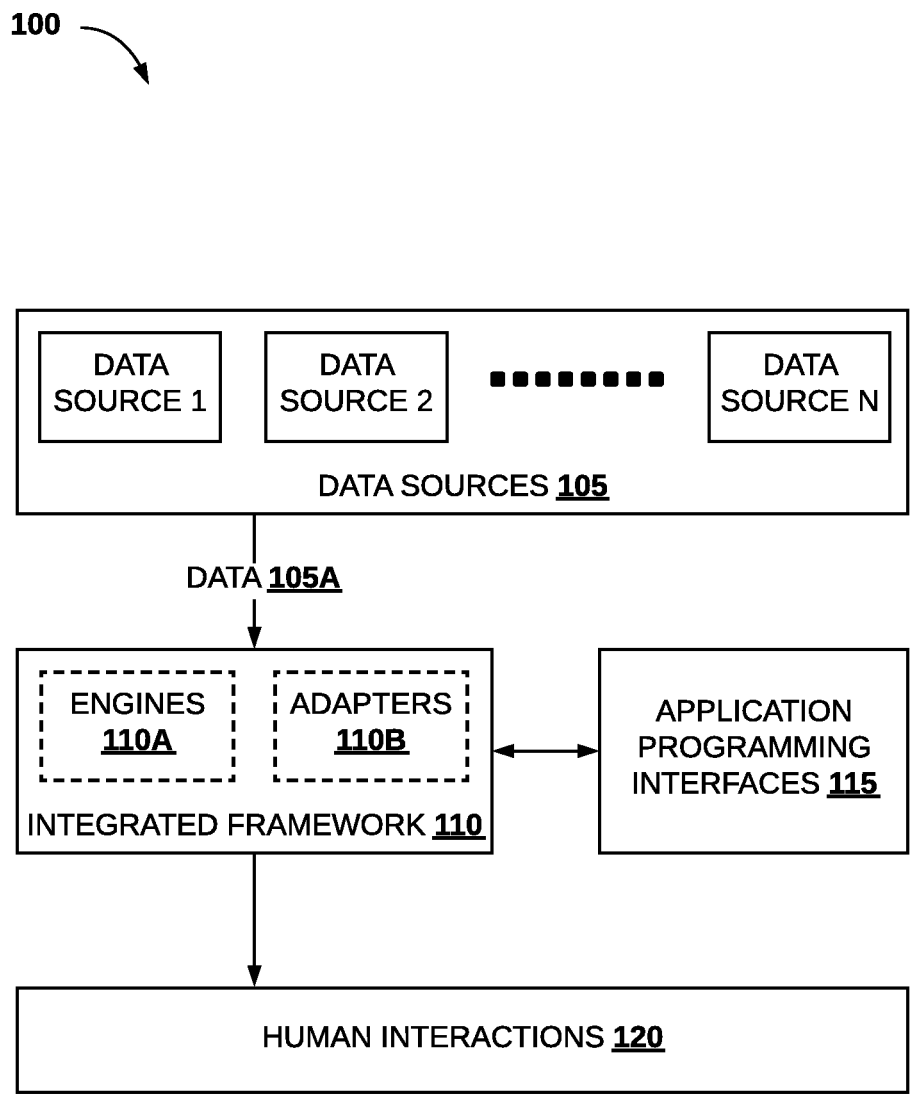
FIG. 1 is a block diagram that illustrates an exemplary environment for managing human interactions, in accordance with an embodiment of the disclosure.

FIG. 1 is a block diagram that illustrates an exemplary environment for managing human interactions, in accordance with an embodiment of the disclosure. With reference to FIG. 1, there is shown an environment 100 that may include a plurality of data sources 105, an integrated framework 110, application programming interfaces 115 and human interactions 120. The integrated framework 110 may include a speech recognition engine, a video intelligence engine, a real time data processing intelligence engine, an audio/speech adapter, a video adapter, a data processing adapter, a text abstraction engine, a text streaming engine, a context management engine, a context database, a sentence generation engine, a conflict detection engine, a conflict resolution engine, an event management processing engine, a user interface engine, and a user management engine.

The plurality of data sources 105 may comprise data source 1 through data source n. Each data source of the plurality of data sources 105 may comprise, for example, real time audio streams, real time video streams, data 105A originating from human interactions over various platforms (e.g., teleconferences, video conferences, etc.).

The integrated framework 110 may comprise engines 110A, and a plurality of adapters 110B. The engines 110A may comprise suitable logic, circuitry, interfaces and/or code executable by the circuitry that may be operable to receive the data 105A from the plurality of data sources 105. An engine may correspond to a special purpose program or an executable code that performs or executes one or more core functions or operations. The engine may implement an execution of the one or more core functions or operations based on configured one or more rules and/or one or more algorithms, to produce specific outcomes. The engines 110A may comprise, for example, speech recognition and/or intelligence engines, audio intelligence engines, video intelligence engines, real time data processing engines, text abstraction engine, text streaming engine, context management engine, sentence generation engine, conflict detection engine, conflict resolution engine, decision engine and event management engine.

The adapters 110B may comprise suitable logic, circuitry, hardware, software interfaces and/or code executable by the circuitry that may be configured to receive data 105A from the plurality of data sources 105 in different data formats. An adapter may correspond to a component that facilitates functionally linking two or more incompatible components for transmission and reception of the data 105A. When an adapter receives an input in one form, the adapter may alter the input to provide or facilitate connecting with other components of the system. The adapters 110B may comprise, for example, audio/speech adapters, video adapters and/or other data processing adapters.

The engines 110A may include executable code and may provide execution of operations or functions, such as processing the data 105A received from the multiple data sources 105, transforming the processed data into textual dataset (also referred to as unified dataset), determine conversations, determine contexts of the conversations, determine conflicts in the conversations, determine conflict resolutions in the conversations, determine action items or tasks from the conversations, and/or determine pending items or tasks from the conversations. The integrated framework 110 including engines, for example, the event management processing engine and the decision engine, may facilitate marking (e.g., highlighting) important information from the conversations, which may include generating follow up questions, generating insights from the conversations, etc., based on multiple sequential and parallel processing and analysis of the human interactions and the conversations. The integrated framework 110 may provision or facilitate managing the human interactions 120.

In operation, engines 110A in the integrated framework 110 may be configured to receive the data 105A from the multiple data sources 105. For example, such data sources may include real time audio streams, real time video streams, the data 105A originating from human interactions over various platforms (e.g., teleconferences, video conferences, etc.). The engines 110A in the integrated framework 110 may be configured to process the data 105A received from the multiple data sources 105. The engines 110A in the integrated framework 110 may be configured to transform the processed data into a unified dataset. The unified dataset transformed may include one or more conversations from one or more participants. The transformation of the processed data may be based on one or more properties of data and/or one or more data sources. The engines 110A in the integrated framework 110 may be configured to stream, transmit or send the unified dataset to other engines 110A for further processing and analysis. The engines 110A in the integrated framework 110 may be configured to determine one or more contexts of the one or more conversations in the unified dataset. The engines 110A in the integrated framework 110 may be configured to determine one or more conflicts in the one or more conversations from the unified dataset. The engines 110A in the integrated framework 110 may be configured to determine one or more conflict resolutions for the determined one or more conflicts in the one or more conversations from the unified dataset. The engines 110A in the integrated framework 110 may be configured to make decisions based on the above described determinations and manage the human interactions 120.

In accordance with an embodiment, the integrated framework 110 may facilitate connecting with different types of application programming interfaces (APIs) 115 based on the implementation. For example, such APIs may include telephony application programming interfaces 115 that may connect with any external system based on telephony systems like voice over internet protocol (VoIP) based on protocols like session-initiated protocol (SIP) or traditional telephony like public switched telephone network (PSTN). In another example, the integrated framework 110 may facilitate connections with any other real-time communication protocols such as WebSocket or remote procedure calls (e.g., gRPC) application programming interfaces 115. For example, the WebSocket APIs may include streaming API that may connect with any system with low latency responses. All requests and responses to the data may be communicated via a single WebSocket connection. All the input data like audio, video, text, etc. may be transmitted and/or received via a single WebSocket connection in the duplex mode. In yet another example, the WebSocket APIs may include events application programming interfaces 115 that may send and receive various events that are happening during the real-time processing of the conversation. In yet another example, the WebSocket APIs may include Text application programming interfaces 115 for only text-based analysis. In yet another example, the WebSocket APIs may include management application programming interfaces 115 to perform various data management tasks, like start, stop processing, provide additional data, fetch, update, create, etc. In yet another example, the integrated framework 110 may interface and communicate with client software development kits (SDKs). The client SDKs for various programming languages may be provided that may facilitate or provision an interface and communicate with multiple application programming interfaces 115 across multiple technology platforms.

Figure 2A:
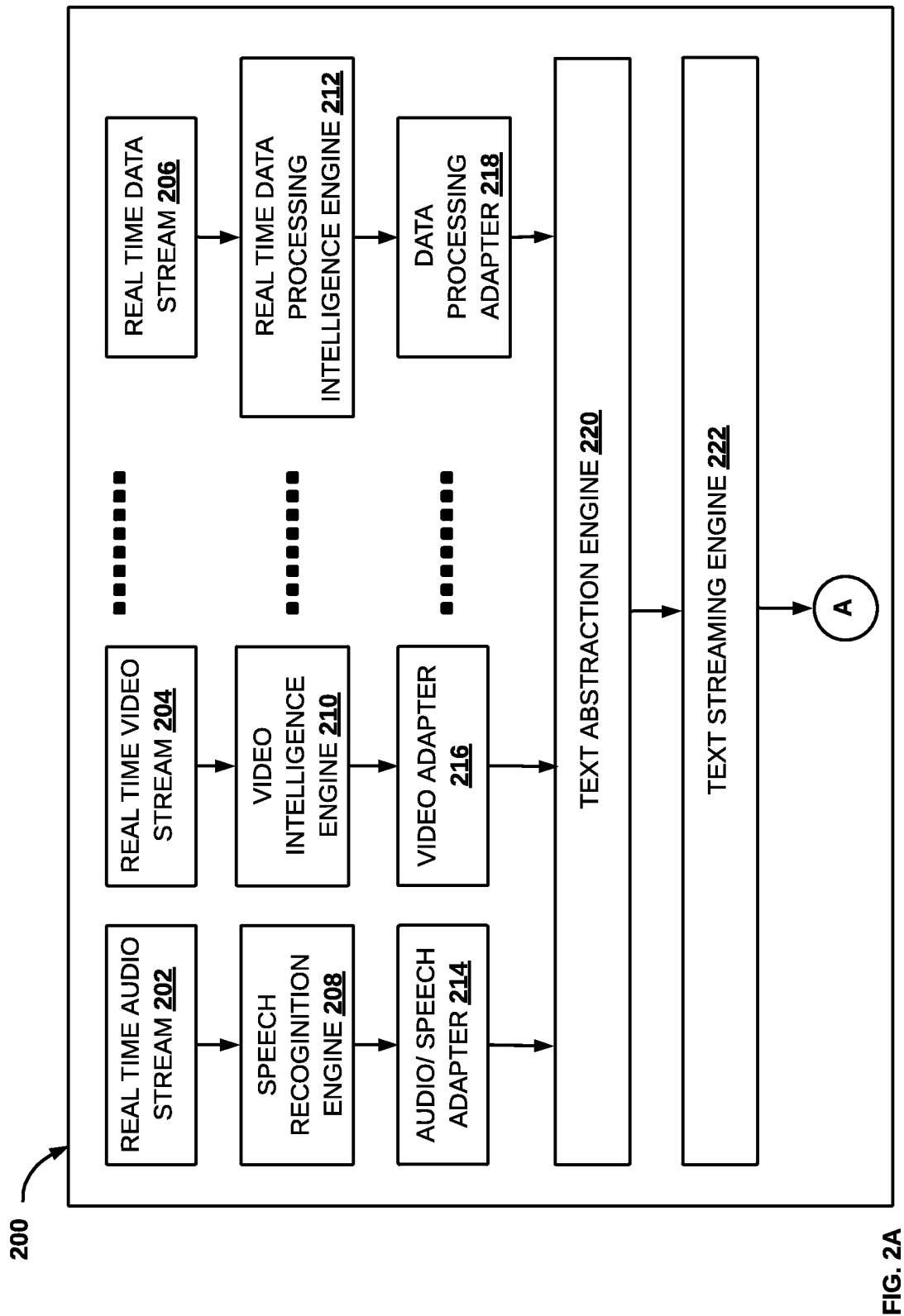
FIG. 2A and FIG. 2B are block diagrams that collectively illustrate an integrated system for managing human interactions, in accordance with an embodiment of the disclosure.
Figure 2B:
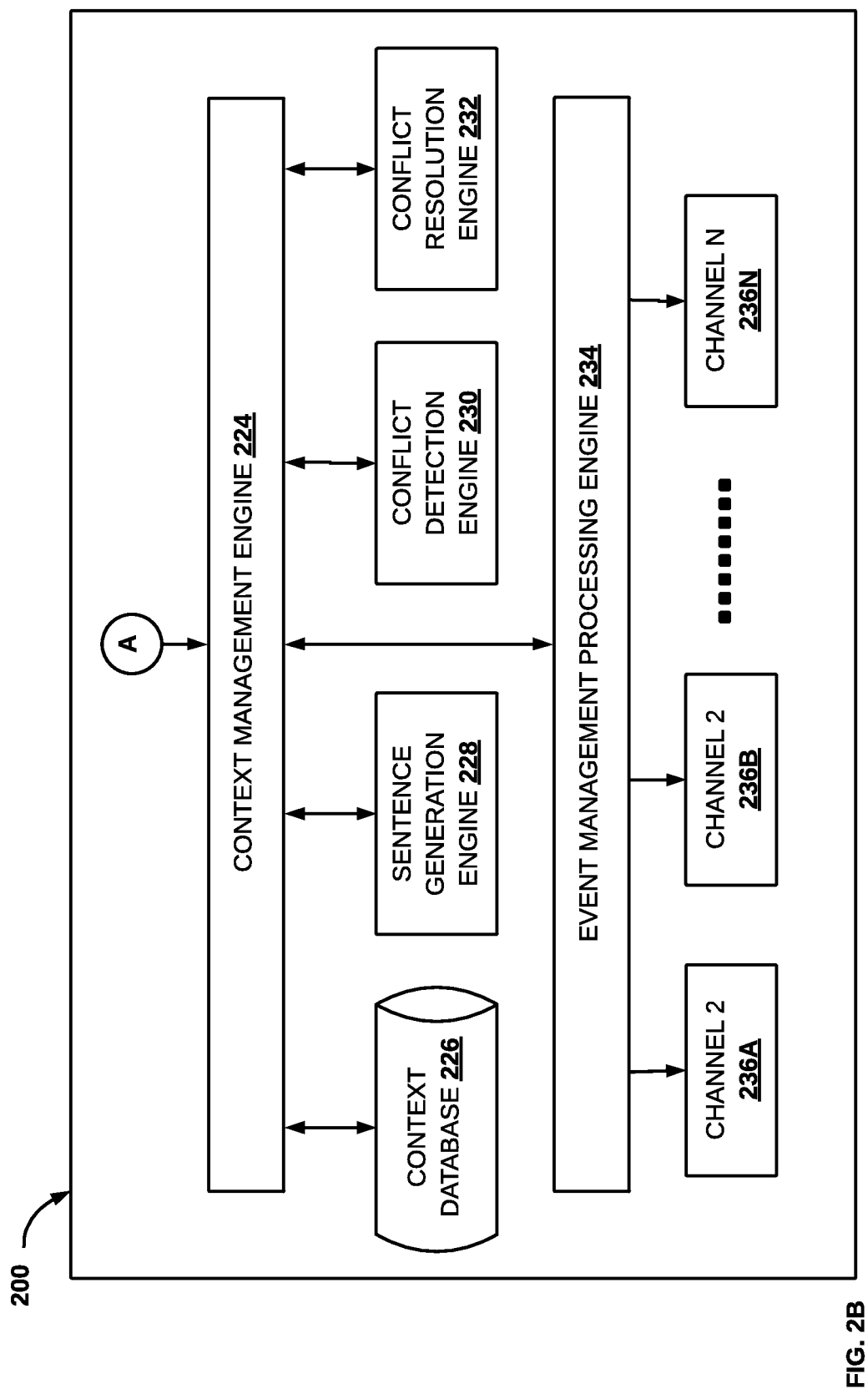

FIG. 2A and FIG. 2B are block diagrams that collectively illustrate an integrated system for managing human interactions, in accordance with an embodiment of the disclosure. FIG. 2A and FIG. 2B show an integrated system 200 that may also be referred an integrated platform including an integration of components, engines and/or adapters for managing human interactions. The integrated system 200 including the integrated framework 110 is described in conjunction with reference numerals of FIG. 1. The integrated system 200 may include data sources, such as real time audio stream 202, real time video stream 204, real time data stream 206, and may include engines/and or adapters, such as a speech recognition engine 208, a video intelligence engine 210, a real time data processing intelligence engine 212, an audio/speech adapter 214, a video adapter 216, a data processing adapter 218, a text abstraction engine 220, a text streaming engine 222, a context management engine 224, a context database 226, a sentence generation engine 228, a conflict detection engine 230, a conflict resolution engine 232 and an event management processing engine 234. The integrated system 200 may also include a user interface engine (not shown), and a user management engine (not shown). The integrated system 200 is agnostic to provision interoperability between the components, engines, applications, etc., that may execute specific functions or operations, either independently or in cooperation. In accordance with an embodiment, human interactions may be carried out, for example, over in-person meetings, seminars, conventions, conference calls, online platforms facilitating voice calls, web-based video conferences, calls over voice over internet protocol (VoIP), electronic mails (emails), text messages, etc. The data based on such human interactions (also referred to as conversations) may generate important items. Such important items may include warranting an action (also referred to as an action item), follow up on tasks, open questions that may need resolution or answers, validation of important information, etc. Further, such important items may be based on a context of the human interactions. In accordance with an embodiment, a context of the human interactions may correspond to written or spoken form that may provide a setting or platform for an event. For example, such contexts may include circumstances based on business interactions, casual interactions, situational based interactions, everyday conversations, etc. Further, the above referenced human interactions may happen in real time or may be recorded and stored in a datastore. When such human interactions happen in real time, the integrated system 200 may facilitate determining such data in real time and provide a mechanism for extracting information or data in real time data. For example, based on the context of the conversations, important items, insights or actions may stem from each human interaction. In the integrated system 200, the foregoing disclosure describes in detail on how some components (e.g., engines and/or adapters) may sequentially process, analyze, transform the data based on an execution of specific operations or functionalities, execution operations for making determinations and generate insights. Such insights may provide further information to the end users or participants in the interactions.

The user interface engine may provision generation of user interfaces (UIs), through which end users or participants can register and login to access or use the integrated system 200. The user management engine may manage user or participant registrations, and/or store user profiles of end users or participants. The integrated system 200 may provision or facilitate deployment and cooperative functioning or operating with third-party applications (not shown) or third-party systems (not shown). Such third-party applications or third-party systems may provision extraction of, for example, textual dataset from the dataset originating from different data sources. For example, the extraction of textual dataset from the data 105A originating from the different data sources 105 may correspond to an execution of operations like parsing the data 105A, determining meaningful information in the data 105A and transforming the determined meaningful information into, for example, textual dataset. The textual dataset may be further processed and analyzed by the components, engines and/or adapters in the integrated system 200. The generation of the data 105A from the multiple data sources 105 may include human interactions over telephonic interactions, in-person interactions, online interactions, conferences, etc. Such interactions may generate the dataset representing audio content. The integrated system 200 may provision a platform for recording such telephonic interactions, in-person interactions, online interactions, or any other form of remote interaction, that may include audio content in different data formats. The audio content may include streams of the data 105A representing, for example, a recorded audio stream or a real time audio stream 202. The integrated system 200 may provision a mechanism for sequentially analyzing the above referenced audio content represented or stored in different formats, in real time. The source of the data 105A may originate through human interactions over video conferences, thereby generating dataset including audio and video content representing different data formats. The audio and video content or dataset may represent, for example, recorded video stream or the real time video stream 204. The integrated system 200 may provision analysis of the above audio and video content represented or stored in different formats, in real time. The source of the data 105A may originate through human interactions over a bridge connect or an online platform or an offline platform hosting the meetings or conferences. For example, the bridge connect or the online platform or the offline platform may facilitate connecting multiple geographically distributed participants over the meetings or the conferences. The above described bridge connect, the online platform or the offline platform may facilitate or provide hosting mechanisms that may include streaming real time content including audio, video, data visualizations, presentations representing real time data stream 206, etc. Such real time data stream 206 may further include data related to enterprise information, human interactions over simulated environments or platforms like virtual reality (VR), augmented reality (AR), online platforms supporting text bots, text chats, etc. All the above data 105A may collectively or independently represent or referred to as real time data stream 206.

In accordance with an embodiment, the dataset (e.g., the real time audio stream 202, the real time video stream 204, the real time data stream 206) may originate from multiple disparate sources. The dataset may be received by third-party applications or third-party systems and processed by the integrated system 200. For instance, the third-party applications or third-party systems may receive the datasets (e.g., the real time audio stream 202, the real time video stream 204, the real time data stream 206) from the data sources 105 (e.g., real time audio conferences, real time video conferences, real time data stream, etc.). The dataset including real time audio stream 202 may be received and processed by the speech recognition engine 208 in the integrated system 200. The speech recognition engine 208 may cooperatively work with the integrated system 200 and may be configured to adapt to incoming audio content. Such adaptability enables the integrated system 200 to be agnostic and provisions appropriate modifications to be made to the corresponding speech adapters. For instance, the speech recognition engine 208 may adapt to the incoming audio content, based on multiple attributes. For example, such attributes of the audio content may correspond to one or more languages, one or more dialects of the corresponding languages, one or more accents of the corresponding languages, quality of audio produced by the source of audio, noise quotient at the source of the audio, the network bandwidth between the data sources 105 and the integrated system 200. The speech recognition engine 208 may also be configured to additionally process the incoming audio data by adaptively filtering the noise, improving the audio quality, and transforming the audio content into a desired data format. Upon processing, the recorded audio stream or the real time audio stream 202 may be transformed into a textual dataset via the audio/speech adapter 214. The dataset including real time video stream 204 may be received and processed by the video intelligence engine 210 in the integrated system 200. The video intelligence engine 210 may cooperatively work in the integrated system 200 and may be configured to adapt to incoming video content. For instance, the video intelligence engine 210 may adapt to the incoming video content, based on multiple attributes. For example, such attributes of the video content may include one or more languages, one or more dialects of the corresponding languages, one or more accents of the corresponding languages, quality of video and audio produced by the source, noise quotient at the source of the audio and video, availability of network bandwidth between the source and the integrated system 200. The video intelligence engine 210 may also be configured to additionally process the incoming video and audio content by adaptively filtering the noise, improving the audio and video quality, and transforming the video and/or audio content into a desired data format. Upon processing, the recorded video stream or real time video stream 204 may be transformed into a composite data set including images and textual dataset by the video adapter 216. The processing the real time video stream 204 by the integrated system 200 in cooperation with the video intelligence engine 210 may also include capturing and recording real-time information in log files. The log files may record events that may occur in the video interactions, video conferences from the recorded or the real time video stream 204. The dataset including the real time audio stream 202, the real time video stream 204, the real time data stream 206, etc., may be available for further processing by the engines 110A and/or adapters 110B, in the integrated system 200. The log files recording the events in the video interactions may include relevant information that may be used for comprehending the interactions. Such information may include the emotional descriptions of the participants at specific instances of time, environmental descriptions in the video, personal descriptions of the speakers, facial detection information to identify expressions of participants, any kind of output produced by content detection system to produce the content present in the video (e.g. white board, presentation etc.). The dataset including the real time data stream 206 may be received and processed by the real time data processing intelligence engine 212 and transformed into the textual dataset by the data processing adapter 218.

In accordance with an embodiment, cooperative working of the engines, such as, the speech recognition engine 208, the video intelligence engine 210, the real time data processing engine 212, the corresponding adapters (e.g., 214, 216, and 218) and the text abstraction engine 220 in the integrated system 200 may collectively be configured to provision execution of operations or functionalities, such as, processing the dataset. Further collective operations or functionalities may include determining tones of the participants in the conversation, emotions or sentiments of the participants at specific instances (e.g., one type of speaker with another), information on pauses in the conversations between participants, determining boundaries between sentences in the conversations, etc. The text abstraction engine 220 may also be referred to as abstract text processing engine that may abstract (e.g., extract) text processing capabilities from the different data sources 105. The engines 110A and/or adapters 110B in the integrated system 200 may be configured to construct additional metadata information detected at different steps in the conversations using above described determinations. In accordance with an embodiment, the components (e.g., 208, 210, 212, 214, 216, 218, 220) of the integrated system 200 may execute further operations, such as determination of indirect references by co-referencing the interactions between specific participants in the ongoing interactions, determining the actors, subjects, actions and objects in the ongoing interaction, determining the tense in which the specific parts of the interaction are referring to, etc. The information corresponding to the above analysis (e.g., determinations, evaluations, etc.) may be executed by different components of the integrated system 200. The text abstraction engine 220 may provide abstraction between the different data sources 105 by hiding the implementation and processing complexities of the different data sources 105 like audio stream, video stream, real-time data stream, etc. The text abstraction engine 220 may further processes the data received from the different data sources 105. The text abstraction engine 220 may transform such processed data into a unified dataset. For example, such transformation may correspond to an aggregation or merging of relevant properties from each of the data sources 105 and/or the data 105A into the unified dataset. The unified dataset may further be processed for normalization and generating metadata information.

For example, consider processing and generating of the unified dataset from online video conferencing meeting. In such a scenario, the data sources 105 may include audio, text (upon conversion of speech to text), video, etc. The information in the textual dataset may represent a transformed dataset. In addition to the above properties of the data sources 105, the accuracy of transformation of the data 105A may be dependent on processing capabilities by the corresponding engines (e.g., the speech recognition engine 208, the video intelligence engine 210, the real time data processing engine 212). The accuracy of information in the transformed dataset may further be also be dependent on the processing and transforming capabilities by the respective adapters (e.g., the audio/speech adapter 214, the video adapter 216, the data processing adapter 218).

In accordance with an embodiment, the transformed dataset including textual dataset may be further processed, analyzed and transformed by the text abstraction engine 220 in the integrated system 200. The text abstraction engine 220 may be configured to read the textual dataset and improvise or enhance the textual dataset into comprehensible and meaningful sentences. For example, the text abstraction engine 220 may execute a decision logic to parse the textual dataset, determine words and/or sentences and improve or enhance the cognition of the determined words and/or sentences. Such improvements or enhancements may be based on a combination of synonyms, context(s) of the sentences, etc. Further enhancements may include substituting and/or modifying the determined words and/or sentences such that the words are comprehensible and meaningful. For example, the text abstraction engine 220 may use and/or replace the determined words and or sentences in the textual dataset with synonyms or identical words, thereby improving or enhancing the words that are comprehensible and meaningful. The text abstraction engine 220 may be configured to receive data from different sources independently that may correspond to the same meeting. Based on the properties of the data sources 105 (e.g., properties or attributes of the meeting, like meeting identifier, participant identifiers, time stamp information, etc.), the text abstraction engine 220 may transform the textual dataset to generate the unified dataset. For instance, the text abstraction engine 220 may transform the data based on a decision logic and aggregate the data to generate the unified dataset. The unified dataset may include multiple conversations from the meeting that may be synchronized based on the above properties of the data sources 105.

In accordance with an embodiment, the text abstraction engine 220 may be configured to execute operations, such as, determining sentences, punctuations, performing operations like correcting sentences including grammatical mistakes and spellings, detection of direct and indirect noun references in the text based on the context of the conversation and the participants, executing operations like detecting entities (e.g., such entities may include number and type of objects such as date, time, location, etc., used in the interactions). The text abstraction engine 220 may also generate metadata based on the unified dataset. For example, such metadata may include entities, tense of sentence (past, present, future, etc.), relation between different words in a long sentence, etc. The text abstraction engine 220 may be implemented using deep neural network. The text abstraction engine 220 may be trained with knowledge datasets including different types of human interactions. Based on such training, the text abstraction engine 220 may adapt to execute, for example, enhancing or improving the words and/or sentences from the unified dataset that are comprehensible and meaningful. The implementation of the text abstraction engine 220 as the deep neural network may facilitate real time training and adaptively improve the operational efficacies for the execution of the above described decision logic. The decision logic may correspond to execution of functions such as, determining words and/or sentences in the unified dataset, classifying the words and/or sentences in the unified dataset and from determined words and/or sentences, improvising or enhancing words and/or sentences that are comprehensible and meaningful. For example, the words and/or sentences in the unified dataset may be classified into abstract category structures. Further, groups of words or a single word in the unified dataset which may relate to a category, an instance or an instance attribute, may be determined or recognized by the text abstraction engine 220. An instance may correspond to a category including a real or an abstract subject, an action attribute and other such similar or identical instances. Further, the above described decision logic, which is based on determination or recognition of categories, determination or recognition of instances and determination or recognition of instance attributes may further provision an improvement in the reconstruction of sentences that are that are comprehensible and meaningful. The text abstraction engine 220 may be configured to determine a subset in the textual dataset that may contain or include meaningful information. The unified dataset may be streamed to the context management engine 224 via the text streaming engine 222.

In accordance with an embodiment, the unified dataset including comprehensible and meaningful words and/or sentences may be streamed for further processing, analysis and transformation to the context management engine 224. For example, the text streaming engine 222 may stream the unified dataset to the context management engine 224. The context management engine 224 may work in cooperation with the context database 226, the sentence generation engine 228, the conflict detection engine 230, the conflict resolution engine 232 and the event management processing engine 234. The context database 226 may store different types of contexts, based on the nature of human interactions or conversations. The sentence generation engine 228 may be configured to reconstruct and/or validate the sentences from the unified dataset.

In accordance with an embodiment, the context management engine 224 may be configured to execute multiple functionalities, for example, modeling or conditioning the unified dataset with different mathematical models to determine topics in human interactions or conversations, executing logic to perform context evaluation, etc. The context management engine 224 may be configured with a combination of multiple decision logic and/or rules for determining and/or classifying contexts from the unified dataset. The context management engine 224 may be implemented using multiple deep neural network systems that may include training the context management engine 224. The context management engine 224 may be trained to adaptively improve operational efficacies for executing decision logic. For example, executing decision logic and/or functions such as, determining contexts in the conversations from the unified dataset, classifying the determined contexts and storing the contexts in the context database 226. The context management engine 224 may be configured to execute operation or functionalities including extracting the context of the conversations from the unified dataset. The context management engine 224 may execute such operations either in real-time or in batch mode. The context of a conversation may refer to an instance or a combination of information structures. Multiple mathematical modeling techniques may be used to model the unified dataset to extract the above information structures from the conversations. The modeling or conditioning of the unified dataset with the mathematical modeling techniques may correspond to manipulation or transformation of the bits of data from the unified dataset.

In accordance with an embodiment, the context management engine 224 may be trained with training dataset and multiple mathematical models may be generated and stored in the context database 226. Based on the data source and the context of the conversations, the unified dataset may be modeled based on multiple mathematical models stored in the context database 226. Based on the modeling, a high-level understanding of the conversations may be represented by a stochastic representation. Stochastic representation may correspond to information or knowledge representation that may also be determined stochastically or randomly. For example, a trained neural network can be considered as a stochastic representation of the learning done by the trained neural network. Such stochastic representation may or may not include human comprehensible structure or information in it. The modeling, analysis and representation of the conversations by the context management engine 224 may be executed by fragmenting or dividing the conversations. Further, based on an execution of the mathematical modeling techniques, multiple concepts from the conversations may be extracted by the context management engine 224. Such extracted concepts from the corresponding conversations may include temporal information and represented cohesively (also referred to as cohesive representation). Cohesive representation may correspond to the representation of the information which may be tightly coupled. For example, the concepts or contexts extracted from the conversations may be tightly coupled with each other and thereby representing or demonstrating cohesiveness between them. The temporal information may correspond to a type of information which may represent cohesive information with reference to the contexts or concepts in the conversations. Furthermore, based on an execution of the mathematical modeling techniques, multiple aspects and features in the conversations at any given instance in the conversations may be extracted by the context management engine 224 and represented as stochastic heuristics.

For example, consider multiple members in a meeting participating in conversations that may include brainstorming sessions. The nature of brainstorming type of conversations may generate dataset that are very high dimensional. Therefore, generating representations including aspects of understanding of the conversations or logically evaluating the conversations based on intuition would be challenging. Consider the above conversations included statements with information, like, "We had $200,000 of revenue last month." Such information may be modeled and extracted to represent highly cohesive information. In the context of the same conversation, suppose that one other participant makes a statement "We had $200,000 of revenue." In accordance with an embodiment, based on the execution of the mathematical modeling techniques, as described above, the context management engine 224 will extract temporal heuristics representing the predictions from the conversations, which were not conveyed directly in the conversation. For instance, in the statement "We had $200,000 of revenue," the time component (e.g., "last month") is not directly mentioned. Based on the execution of the above described mathematical modeling techniques, the context management engine 224 may extract temporal heuristics for the context of the conversations, associate it with the brainstorming session and store it in the context database 226. The context management engine 224 may persist the contexts of other conversations (e.g., previous conversations, pre-recorded conversations, etc.) in another communicatively coupled data store and access such contexts from any previous conversations.

In accordance with an embodiment, the conflict detection engine 230 may be implemented using a deep learning neural network architecture. The conflict detection engine 230 may be implemented as one or more Deep Neural Networks (DNN) architectures. Such multilayered implementation including one or more DNN architectures may enable training the conflict detection engine 230 to execute functions or operations at a deeper level on the reconstructed unified dataset. The conflict detection engine 230 may be trained using knowledge datasets that may include reconstructed unified dataset. For example, such trainings may include methodologies related to determination of information at sentence level, information embedding in sentences, etc., that may facilitate determination of the hypothesis and the conflicts in the human interactions. The conflict detection engine 230 may instantiate one or more DNN architectures based on complexity and/or information of the unified dataset. For example, different layers of DNN architecture of the conflict detection engine 230 may be configured with a combination of probability rules, context detection-based rules, etc., and the conflict detection engine 230 may instantiate corresponding DNN layer to analyze, process, transform and determine important items (e.g., hypothesis, conflicts, etc.) in the conversations. The deep neural network-based implementation of the conflict detection engine 230 may enable training the conflict detection engine 230 in real-time as the human interactions are ongoing or based on a recorded dataset of prior human interactions.

In accordance with an embodiment, implementation of conflict detection engine 230 may also include an integration of multiple natural language processing (NLP) algorithms, that may work independently or in cooperation. The conflict detection engine 230 may use above described information extracted by the context management engine 224 with reference to contexts of the conversations. The conflict detection engine 230 may use the information extracted by the context management engine 224 and detect and/or determine hypothesis and conflicts in the conversations. The conflicts in the conversations may correspond to a misalignment of events (e.g., misaligned events) in the contexts of the conversations. Such misaligned events may be determined and/or detected by the conflict detection engine 230 when an event in the free-flowing conversation appears to have misaligned with the context of the conversation at a specific instance of time. The conflict detection engine 230 may be configured to adaptively train to detect such misaligned events or conflicts. Further, the conflict detection engine 230 may also execute operations or functions, such as determination of statements/events that can be detected as "conflict" with reference to current context of a conversations, but hypothetically may not be conflicting in nature. Such statements/events may correspond to rhetoric, sarcastic, humorous, etc., in the conversations.

For example, consider a business meeting where, towards the end of the meeting a discussion on a follow up meeting stems up. John is the COO of Company X and Jenny is the CEO of Company Y. John makes a statement as "Let's have a follow up meeting next week, at a same time to discuss the next steps," and Jenny replies "Actually, next week I am on a vacation and it may not be possible to meet". In such an instance, based on the context of the conversation in the business meeting, conflict detection engine 230 working in cooperation with the context management engine 224, may detect or determine a conflict between in the above two statements made by 'John' and 'Jenny.' Upon determining such conflict, the conflict detection engine 230 may insert a 'tag' and classify the corresponding sentence from the business meeting with an identifier, for example, 'open item.' Such 'open items' may be aggregated, attached with the identifier of the business meeting, marked up and communicated to 'John' and 'Jenny' as an 'open item,' that may need attention.

In accordance with an embodiment, the conflict resolution engine 232 may work in cooperation with the context management engine 224, the conflict detection engine 230, the sentence generation engine 228 and the context database 226. The conflict resolution engine 232 may be configured with multiple rules and protocols to resolve conflicts determined or detected by the conflict detection engine 230. In accordance with an embodiment, the conflict resolution engine 232 may be implemented as a deep neural network. Such implementation may enable training the conflict resolution engine 232 using knowledge datasets that may identically correspond to reconstructed textual dataset. The conflict resolution engine 232 may provide a resolution of conflict based on the original statement in the context of the conversation. The conflict resolution engine 232 may be trained using attributes related to conflict resolution and a corresponding hypothesis from the reconstructed textual dataset. The implementation of the conflict resolution engine 232 as a deep neural network may facilitate learning to adaptively improve the execution and operational efficacies, as described above, in real time. In an on-going communication or on a recorded dataset of the human interactions, the conflict resolution engine 232 may execute the above functionalities and provide resolution. The conflict resolution engine 232 may further include an implementation and/or integration of multiple NLP algorithms. The conflict resolution engine 232 can be configured to detect and make recommendations/suggestions of potential conversations that may lead to conflicts and make or suggest potential resolutions to the conversations.

For example, consider an identical business meeting, as described above with reference, to demonstrate conflict detection process. Consider that the conversation, as described above is followed by a statement by either 'John' or 'Jenny'. For instance, consider John makes a statement: "No problem, I will schedule a follow up meeting a week after next" or Jenny makes a statement: "Let me get back to you with a suitable date time for the follow up meeting, once I am back from vacation". The cooperative working of the components (e.g., 222, 224, 226, 228, 230 and 232) may identify the context of the above discussion or conversation and determine or detect a resolution to a previously detected conflict. Based on this analysis and evaluation, the integrated system 200 determines that the open item is resolved. Further, integrated system 200 may assimilate and represent tagged identities or a summarized version of the related sentences.

In accordance with an embodiment, a decision engine (e.g., 345A in FIG. 3) in cooperation with the context management engine 224 in the integrated system 200 may provision making decisions based on the context of the discussion or the interactions. The decision engine (e.g., 345A in FIG. 3) may synchronize the above described steps of detection or determination of conflicts and conflict resolutions and manage the outcomes. For example, the outcomes may be managed based on processing and/or analysis of the above described engines (e.g., 220, 222, 224, 228, 230, 232 and 234) in the integrated system 200. In accordance with an embodiment, the event management processing engine 234 may process the above referenced interactions and/or discussions via different channels (e.g., channel 1 236A, channel 2 236B, channel N 236N). The events processed via above referenced channels may correspond to outcomes, open items, questions, pending responses, action items, follow ups, etc. Based on the processing and analysis by components, engines, etc., of the integrated system 200.

In operation, the engines (e.g., 208, 210, 212, 220, 222, 224, 228, 230, 232, 234 and 345A) and/or the adapters (e.g., 214, 216, and 218) in the integrated system 200 may be configured to perform multiple operations and functionalities (as described with reference to FIG. 2A and FIG. 2B) on the data 105A received from the multiple data sources 105 and manage human interactions. For example, the data sources 105 may include real time audio streams, real time video streams, data originating from human interactions over various platforms (e.g., teleconferences, video conferences, etc.). The engines (e.g., 208, 210, 212) and/or the adapters (e.g., 214, 216, and 218) in the integrated system 200 may process the data received from multiple sources. For example, the engines (e.g., 208, 210, 212) and/or adapters (e.g., 214, 216, and 218) may include speech recognition engines, video intelligence engines, real time data processing engines, audio/speech adapters, video adapters and/or data processing adapters. The engine, for example, the text abstraction engine 220 in the integrated system 200 may be configured to transform the processed data into a unified dataset. The unified dataset transformed by the text abstraction engine 220 may include one or more conversations from one or more participants. The transformation of the processed data by the text abstraction engine 220 may be based on one or more properties of the data 105A and/or one or more data sources 105. The text abstraction engine 220 may be configured to provide an abstraction between the multiple data sources (e.g., 105, 202, 204 and 206). Further, the text abstraction engine 220 may be configured to aggregate the processed data, such that the aggregation is based on the transformation including the one or more properties of the data 105A and/or the data sources 105. The engine, for example, the text streaming engine 222, may stream the processed and transformed unified dataset for further analysis and processing by the other engines (e.g., 224, 228, 230, 232, 234, and 345A) in the integrated system 200.

The engine, for example, the context management engine 224 in the integrated system 200, may be configured to receive the unified dataset. The text streaming engine 222 in the integrated system 200 may be configured to stream, transmit and/or send the unified dataset to the context management engine 224. The context management engine 224 in the integrated system 200 may be configured to determine one or more contexts of the one or more conversations in the unified dataset. The context management engine 224 may be configured to model the one or more contexts in the one or more conversations from the unified dataset by one or more advanced mathematical modeling techniques. For example, modeling and/or conditioning the unified dataset with mathematical modeling techniques may include transforming the unified dataset based on the mathematical model. Based on the modeling, the context management engine 224 may be configured to extract a stochastic representation of the one or more contexts in the one or more conversations from the unified dataset. Based on the modeling, the context management engine 224 may be configured to extract a cohesive representation including a temporal information from the one or more contexts in the one or more conversations from the unified dataset. Based on the modeling, the context management engine 224 may be configured to extract one or more temporal heuristics from the one or more contexts in the one or more conversations from the unified dataset. The context management engine may be configured to determine the one or more contexts from the one or more conversations in the unified dataset based on the extracted stochastic representation, the extracted cohesive representation including the temporal information and the extracted one or more temporal heuristics. The engine, for example, the conflict detection engine 230 in the integrated system 200 may be configured to determine one or more conflicts in the one or more conversations from the unified dataset. The conflicts may correspond to one or more misaligned events in the contexts of the conversations. The engine, for example, the conflict resolution engine 232 in the integrated system 200 may be configured to determine one or more conflict resolutions for the determined one or more conflicts in the one or more conversations from the unified dataset. The engine, for example, the event management processing engine 234 in the integrated system 200 may be configured to manage the human interactions. For example, the event management processing engine 234 may manage the human interactions based on the determined one or more contexts, the determined one or more conflicts and the determined one or more conflict resolutions. The event management processing engine 234 may be configured to generate multiple events and action items including insights. The generated multiple events and action items including insights may be processed and notifications may be generated and communicated through one or more communication channels by the event management processing engine 234. The integrated system 200 includes suitable logic, interfaces, engines and/or adapters, one or more circuitries and/or code executable by the circuitries. The above described functionalities and operations of the integrated system 200 may be executed by one or more circuitries and/or code executable by the circuitries.

In accordance with an embodiment, the above described mechanism implemented as the integrated system 200 may also provide a validation of any pending or important action items, in response to the human interactions. For instance, such information or insights may be used to validate information, as to whether the communication is ongoing, whether the communication has concluded, whether the communication has led to generation of more diligence and further investigation on the topic of interest or topic of discussion, etc. The insights may be transformed into graphical visualizations or visual analytics that can be used for automating business decisions. Further optimizations provided by the above described integrated system may include reduction in time, improved user experience and an improvement in quality of human interactions.

Figure 3:
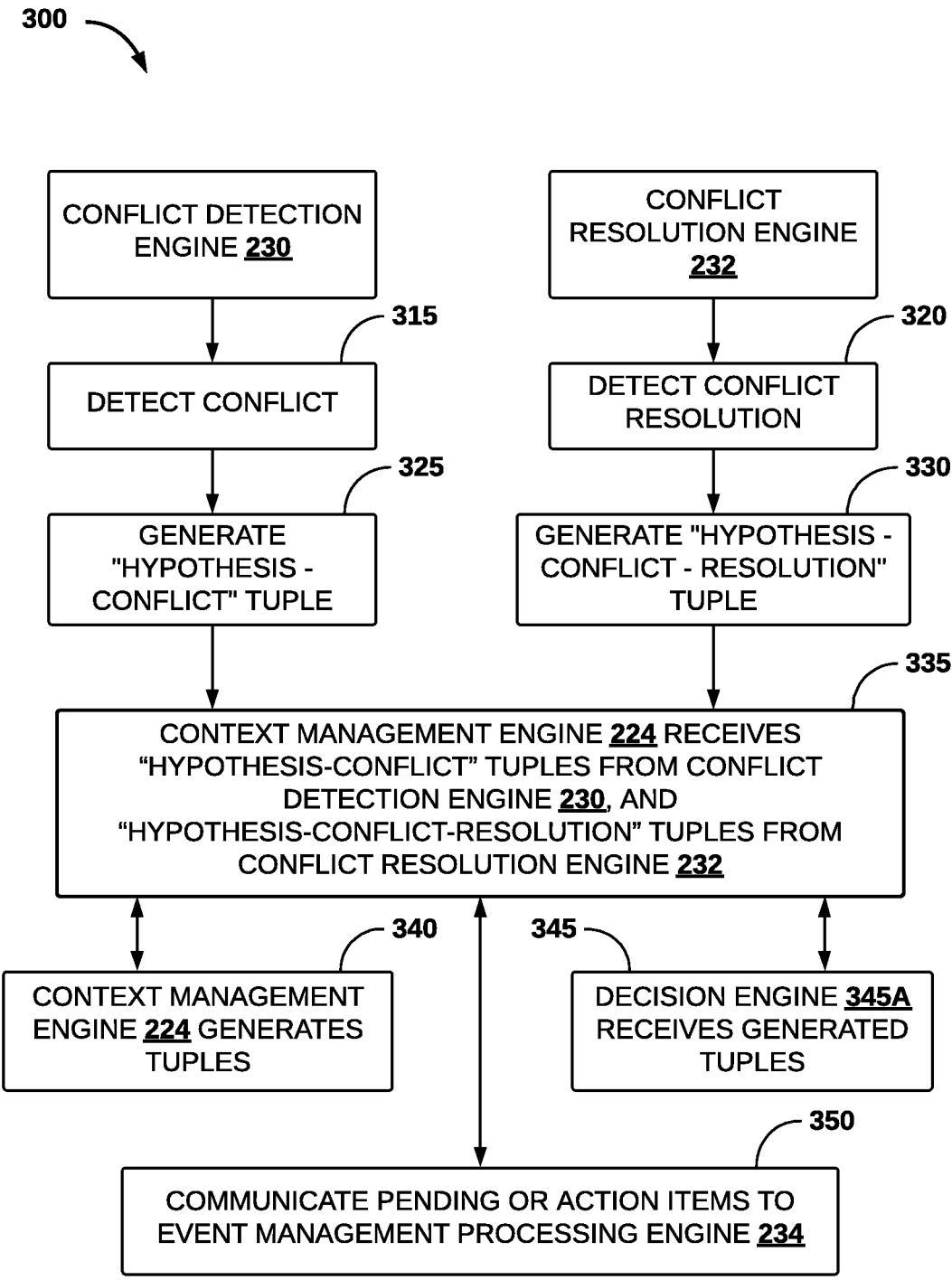
FIG. 3 shows a flow diagram for generating tuples and cooperation of the conflict detection engine, the conflict resolution engine and the context management engine, in accordance with an embodiment of the disclosure.

FIG. 3 shows flow diagram 300 for generating tuples and cooperation of the conflict detection engine 230, the conflict resolution engine 232 and the context management engine 224, in accordance with an embodiment of the disclosure. The flow diagram 300 is described in conjunction with FIG. 2A and FIG. 2B. In accordance with an embodiment, at 315, the conflict detection engine 230 may detect conflict in the conversations. Upon detecting conflicts, at 325, the conflict detection engine 230 may generate "hypothesis-conflict" tuples. In the context of the same conversation, the conflict resolution engine 232 may be in execution to detect any resolution in the conflicts detected (e.g., 315) by the conflict detection engine 230. In the context of the same conversation, at 320, the conflict resolution engine 232 may detect conflict resolutions. Upon detection of resolution, at 330, the conflict resolution engine 232 may generate "hypothesis-conflict-resolution" tuples. At 335, the context management engine 224 receives the "hypothesis-conflict" tuples from the conflict detection engine and "hypothesis-conflict-resolution" tuples from the conflict resolution engine 232. At 340, the context management engine 224 generates tuples, that may be used by the context management engine 224, for evaluating confidence of the conflict detections and conflict resolutions, as a part of the context management process. For example, the context management engine 224 in cooperation with the conflict detection engine 230 and the conflict resolution engine 232 may determine hypotheses, a conflict to existing hypothesis, a resolution to existing conflict, or conflict to an existing resolution. The tuple generated at 340 represents this information.

In accordance with an embodiment, when further conflicts to an existing resolution are detected by the conflict detection engine 230, a nested tuple may be generated by the conflict detection engine 230. Further, when a resolution to such a situation is detected by the conflict resolution engine 232, the conflict resolution engine 232 may generate a nested tuple. The mechanism for generating nested tuples may continue further with reference to a specific conversation, as long as further resolutions and conflicts are detected. For example, consider that after John says—"Let's have a follow up meeting next week, at the same time to discuss the next steps," the context management engine 224 may generate tuple(s) 340 with only one entry for hypothesis, represented as [[[hypothesis]]]. When Jenny replies "Actually, next week I am on a vacation and it may not be possible to meet" will result in generation of tuple [[[hypothesis]]], [[conflict]], where the [[conflict]] tuple would be generated (e.g., 325) by the conflict detection engine 230, as described above. Suppose that Jenny continues as "Would Friday this week work?" and John replies "Yes, that would work", the context management engine 224 would generate tuple [[resolution]] by the conflict resolution engine 232 and tuple generated by the context management engine (e.g., 340) would be represented as [[[hypothesis]], [[conflict]], [[resolution]]]. Subsequently, consider that Jenny replies again "So sorry, Friday is not possible, it will have to be the first Monday next month" that would lead to generation of [[conflict]] tuple by the conflict detection engine 230 and tuple generated by the context management engine 224 would be represented as [[[hypothesis], [conflict], [resolution], [conflict]]]. Subsequently when John replies "Okay. that works for me as well", the context management engine 224 would generate tuple (e.g., 340) represented as [[[hypothesis]], [[conflict]], [[resolution], [conflict], [resolution]]]. At 345, the decision engine 345A receives the generated tuples (e.g., 340) from the context management engine 224. Based on a determination of one or more resolutions, pending or action items may be determined. At 350, the context management engine 224 may communicate the pending or action items to the event management processing engine 234.

In accordance with an embodiment, tuples (e.g., 340) may be generated by the context management engine 224 in real time during an on-going conversation or for recorded human interactions. A natural language representation of tuples 340 may be generated by the context management engine 224 by working in cooperation with the sentence generation engine 228, the conflict detection engine 230 and the conflict resolution engine 232. In accordance with an embodiment, the objective of natural language representation is to convey concise information in a single sentence, without losing vital information. The above described implementation including deep neural networks or deep learning techniques may be implemented using generative neural networks. Such implementation of the above described components as deep neural network may facilitate execution of operations on the reconstructed unified dataset to determine and extract contextual data or contextual information such as, date, location, participants of the human interactions, etc. When the references of identical hypotheses are detected with already existing conflicts or resolutions, the references may be updated with newly identified conflict or resolution and new natural language sentences may be generated to represent and convey the information.

Figure 4:
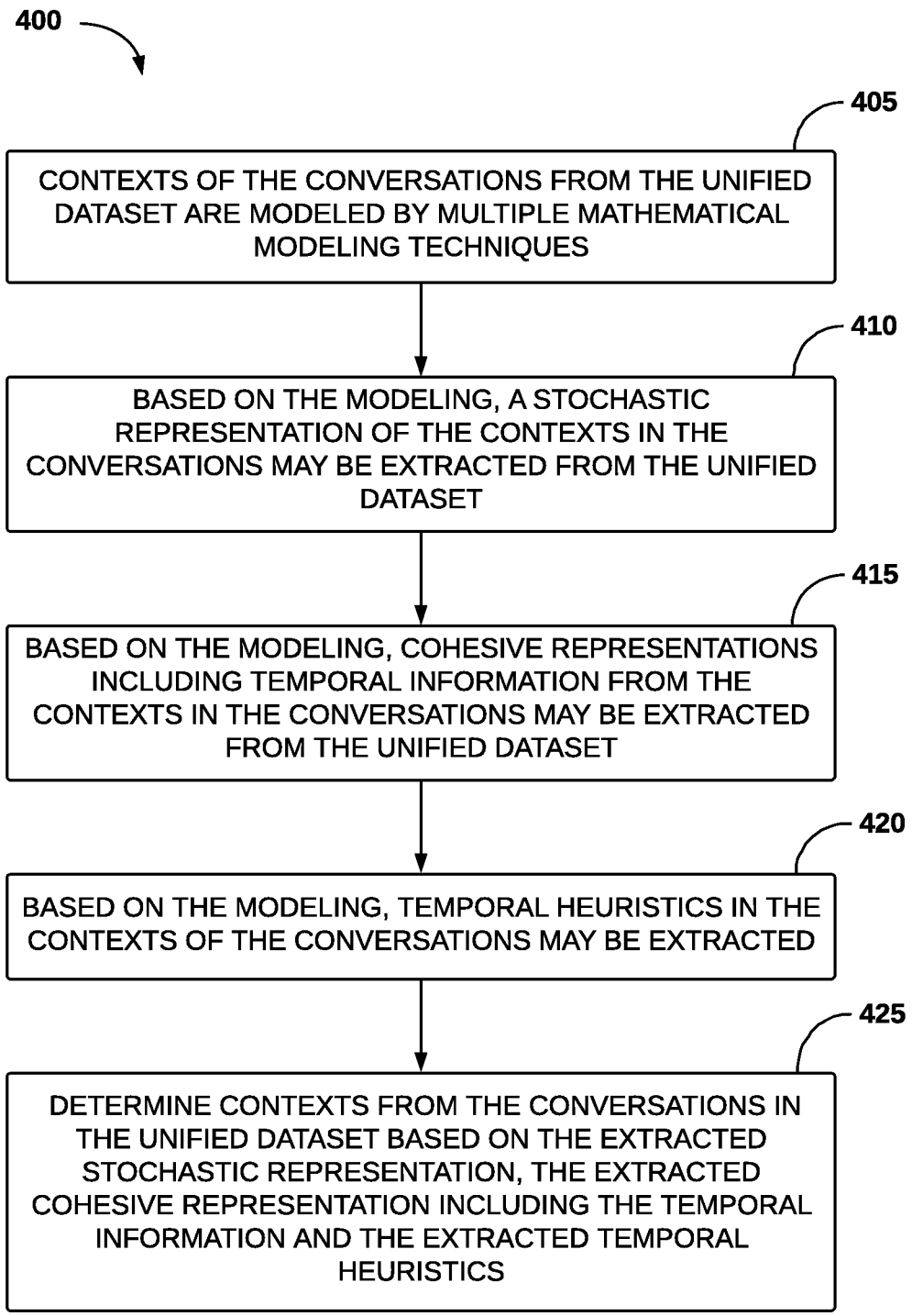
FIG. 4 shows a flow diagram to determine contexts of conversations by context management engine, in accordance with an embodiment of the disclosure.

FIG. 4 shows a flow diagram 400 to determine contexts of conversations by context management engine, in accordance with an embodiment of the disclosure. The flow diagram 400 is described in conjunction with FIG. 2A and FIG. 2B that collectively illustrate operational efficacies and functionalities of the context management engine 224. As described in accordance with an embodiment of the disclosure, the context management engine 224 may be configured to determine the contexts of the conversations from the unified dataset. At 405, contexts of the conversations from the unified dataset are modeled by multiple mathematical modeling techniques. The modeling or conditioning of the unified dataset with the mathematical modeling techniques may correspond to manipulation or transformation of the bits of data from the unified dataset. At 410, based on the modeling, a stochastic representation of the contexts in the conversations may be extracted from the unified dataset. At 415, based on the modeling, cohesive representations including temporal information from the contexts in the conversations may be extracted from the unified dataset is extracted. At 420, based on the modeling, temporal heuristics in the contexts of the conversations may be extracted. At 425, determine contexts from the conversations in the unified dataset based on the extracted stochastic representation, the extracted cohesive representation including the temporal information and the extracted temporal heuristics. In accordance with an embodiment, the determined contexts may be stored in the context database 226 that is communicatively coupled with the context management engine 224, as shown and described.

Figure 5:
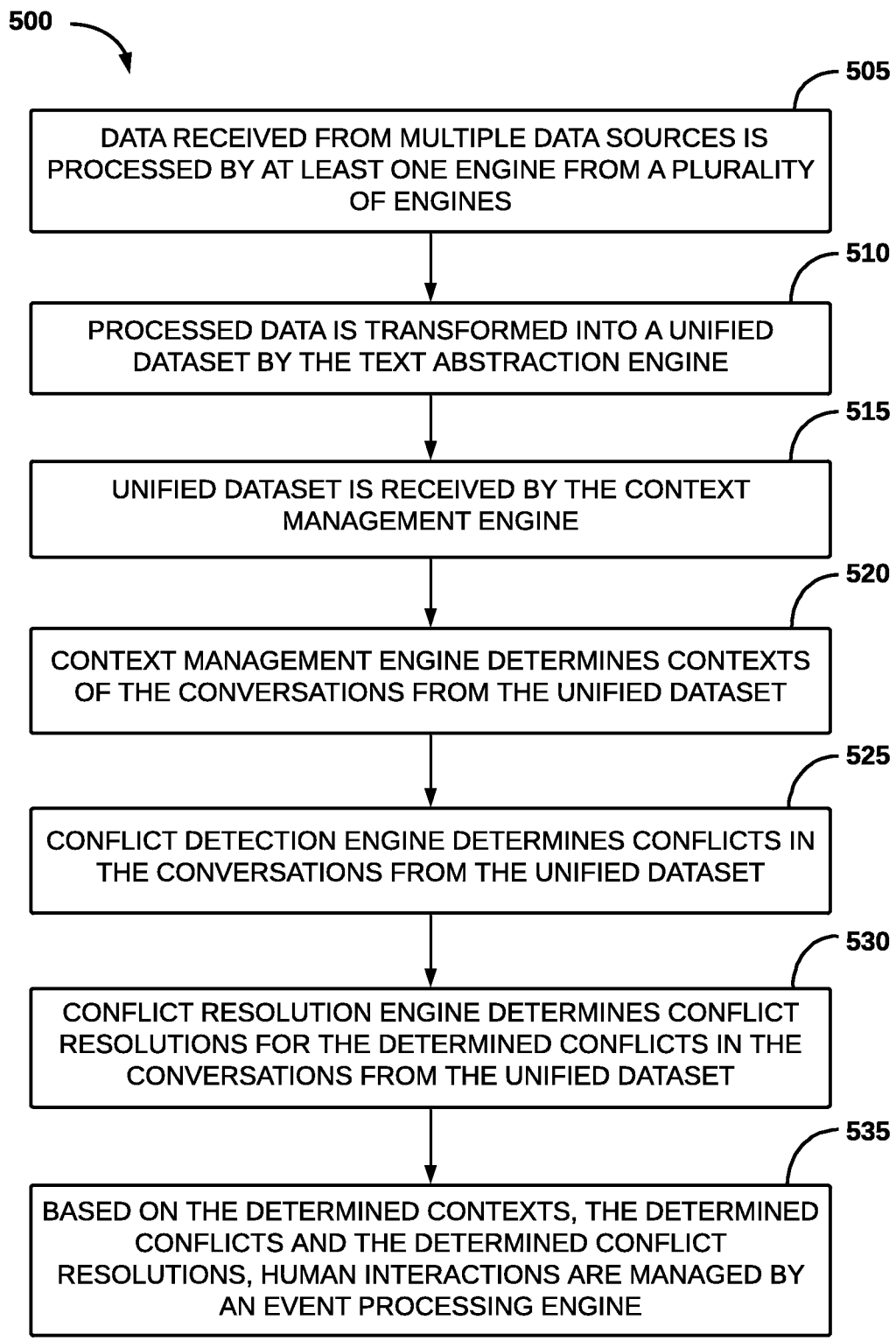
FIG. 5 shows a flow diagram for managing human interactions, in accordance with an embodiment of the disclosure.

FIG. 5 shows a flow diagram 500 for managing human interactions, in accordance with an embodiment of the disclosure. The flow diagram 500 is described in conjunction with FIG. 1, FIG. 2A, FIG. 2B, FIG. 3 and FIG. 4. In the integrated system 200, at 505, the data 105A received from the multiple data sources 105 is processed by at least one engine from a plurality of engines. The data 105A may be received from the multiple data sources (e.g., 105, 202, 204, 206). The data 105A received from the multiple data sources 105 may be processed by a corresponding engine. For example, when the data source is the real time audio stream 202, it may be processed by the speech recognition engine 208. When the data source is the real time video stream 204, it may be processed by the video intelligence engine 210. When the data source is the real time data stream 206, it may be processed by the real time data processing intelligence engine 212. At 510, the processed data is transformed into a unified dataset by the text abstraction engine 220. For example, the transformation of the processed data into the unified dataset may be based on properties or attributes of the data 105A and/or the data sources (e.g., 105, 202, 204, 206). At 515, the unified dataset is received by the context management engine 224. At 520, the context management engine 224 determines contexts of the conversations from the unified dataset. As described in FIG. 4, the context management engine 224 may execute the steps described in flow diagram 400 to determine the contexts of the conversations in the unified dataset. At 525, the conflict detection engine 230 determines conflicts in the conversations from the unified dataset. The mechanism for generating tuples for detecting conflicts by the conflict detection engine 230 is as described with reference to FIG. 3. At 530, the conflict resolution engine 232 determines conflict resolutions for the determined conflicts in the conversations from the unified dataset. The mechanism for generating tuples for detecting resolutions by the conflict resolution engine is as described in FIG. 3. At 535, based on the determined contexts, the determined conflicts and the determined conflict resolutions, human interactions are managed by the event management processing engine 234. The functional and operational efficacies of the processing engines (e.g., the speech processing engine 208, the video intelligence engine 210, the real time data processing intelligence engine 212), the text abstraction engine 220, the context management engine 224, the conflict detection engine 230, the conflict resolution engine 232, the event management processing engine 234, and other components in the integrated system 200, are as described with reference to FIG. 2A and FIG. 2B.

Figure 6:
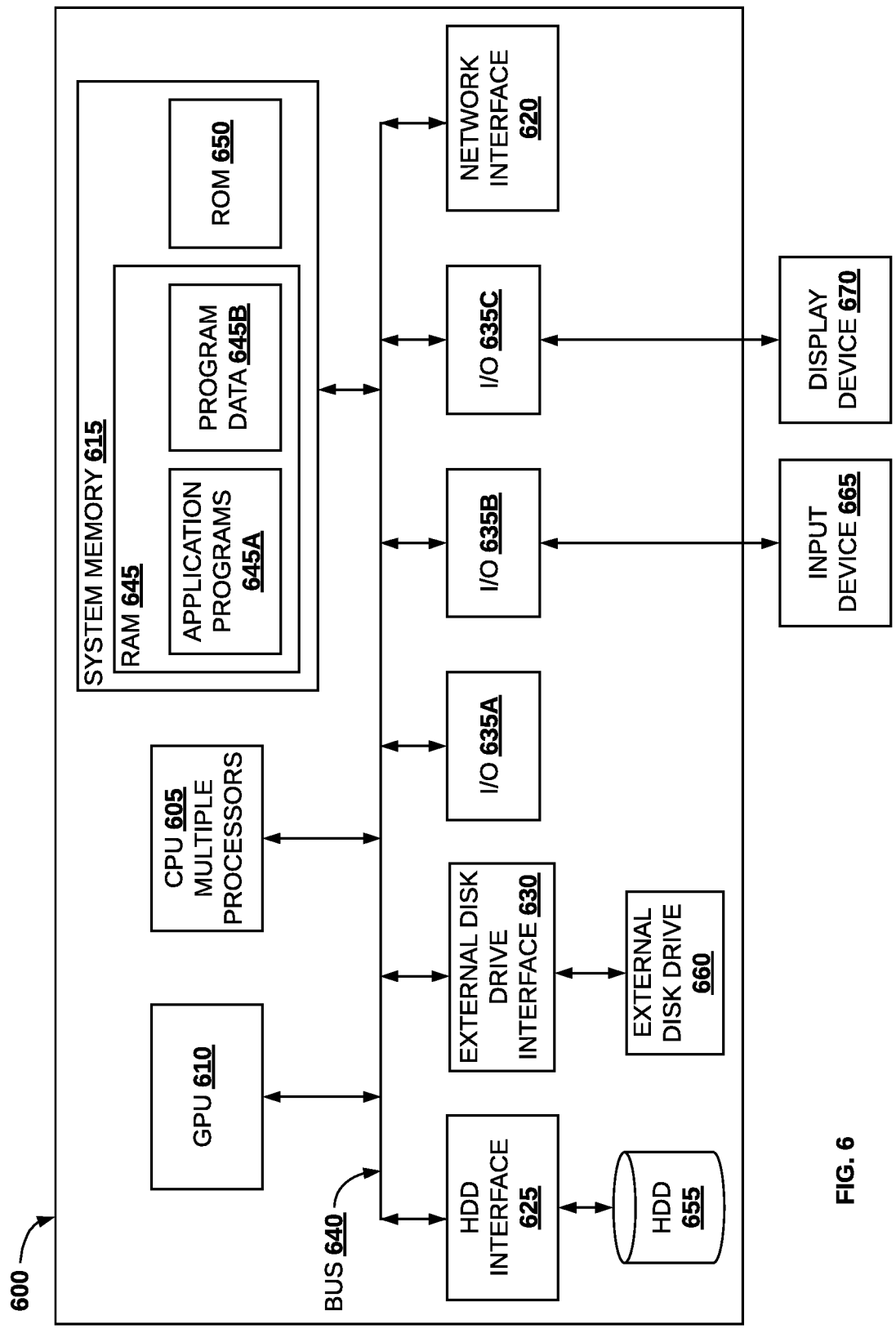
FIG. 6 shows an exemplary hardware configuration of a computer that may be used to implement components of integrated system for managing human interactions described herein, in accordance with an embodiment of the disclosure.

FIG. 6 shows an exemplary hardware configuration of computer 600 that may be used to implement components of integrated system for managing human interactions, described herein, in accordance with an embodiment of the disclosure. In accordance with an embodiment, the engines and/or adapters of in the integrated system 200 may include the speech recognition engine 208, the video intelligence engine 210, the real time data processing intelligence engine 212, the audio/speech adapter 214, the video adapter 216, the data processing adapter 218, the text abstraction engine 220, the text streaming engine 222, the context management engine 224, the context database 226, the sentence generation engine 228, the conflict detection engine 230, the conflict resolution engine 232, the event management processing engine 234, the user interface engine (not shown) and the user management engine (not shown). The computer 600 shown in FIG. 6 includes CPU 605, GPU 610, system memory 615, network interface 620, hard disk drive (HDD) interface 625, external disk drive interface 630 and input/output (I/O) interfaces 635A, 635B, 635C. These elements of the computer are coupled to each other via system bus 640. The CPU 605 may perform arithmetic, logic and/or control operations by accessing system memory 615. The CPU 605 may implement the processors of the exemplary devices and/or system described above. The GPU 610 may perform operations for processing graphic or AI tasks. In case computer 600 is used for implementing exemplary central processing device, GPU 610 may be GPU 610 of the exemplary central processing device as described above. The computer 600 does not necessarily include GPU 610, for example, in case computer 600 is used for implementing a device other than central processing device. The system memory 615 may store information and/or instructions for use in combination with the CPU 605. The system memory 615 may include volatile and non-volatile memory, such as random-access memory (RAM) 645 and read only memory (ROM) 650. A basic input/output system (BIOS) containing the basic routines that helps to transfer information between elements within the computer 600, such as during start-up, may be stored in ROM 650. The system bus 640 may be any of several types of bus structures including a memory bus or memory controller, a peripheral bus, and a local bus using any of a variety of bus architectures.

The computer may include network interface 620 for communicating with other computers and/or devices via a network.

Further, the computer may include hard disk drive (HDD) 355 for reading from and writing to a hard disk (not shown), and external disk drive 660 for reading from or writing to a removable disk (not shown). The removable disk may be a magnetic disk for a magnetic disk drive or an optical disk such as a CD ROM for an optical disk drive. The HDD 655 and external disk drive 660 are connected to the system bus 640 by HDD interface 625 and external disk drive interface 630 respectively. The drives and their associated non-transitory computer-readable media provide non-volatile storage of computer-readable instructions, data structures, program modules and other data for the general-purpose computer. The computer-readable instructions may correspond to the speech recognition engine 208, the video intelligence engine 210, the real time data processing intelligence engine 212, the audio/speech adapter 214, the video adapter 216, the data processing adapter 218, the text abstraction engine 220, the text streaming engine 222, the context management engine 224, the context database 226, the sentence generation engine 228, the conflict detection engine 230, the conflict resolution engine 232, the event management processing engine 234, the user interface engine and the user management engine. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 650 or RAM 645, including an operating system (not shown), one or more application programs 645A, other program modules (not shown), and program data 645B. The application programs may include at least a part of the functionality as described above.

The computer 600 may be connected to input device 665 such as mouse and/or keyboard and display device 670 such as liquid crystal display, via corresponding I/O interfaces 635A to 635C and the system bus 640. In addition to an implementation using a computer 600 as shown in FIG. 6, a part or all the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A system to manage human interactions, the system comprising:
 a memory that stores instructions; and
 a processor configured to execute the instructions, and based on the executed instructions, the processor is further configured to:
  process data received from a plurality of data sources;
  transform the processed data into a unified dataset, based on one or more properties of one or more data sources from the plurality of data sources;
  determine one or more contexts of one or more conversations from the unified dataset;
  determine one or more conflicts in the one or more conversations from the unified dataset using a training model,
   wherein the one or more conflicts determined at a time instance corresponds to one or more events in the one or more conversations that are misaligned with a current context of the one or more conversations in the time instance;
  generate one or more tuples associated with the determined one or more conflicts in each of the one or more conversations;
  determine one or more conflict resolutions for the determined one or more conflicts in each of the one or more conversations from the unified dataset based on the generated one or more tuples;
  manage the human interactions based on the determined one or more contexts, the determined one or more conflicts and the determined one or more conflict resolutions;
  determine presence of an existing conflict in the one or more conflicts of a specific conversation of the one or more conversations;
  generate a nested tuple associated with the specific conversation based on the existing conflict;
  determine one or more resolutions based on the generated nested tuple;
  determine a pending item based on the determined one or more resolutions; and
  communicate the determined pending item to another processor.

2. The system of claim 1, wherein the processor is further configured to:
 provide an abstraction between the plurality of data sources; and
 aggregate the processed data based on the transformation including the one or more properties of the one or more data sources.

3. The system of claim 1, wherein the processor is further configured to:
 model the one or more contexts of the one or more conversations from the unified dataset by one or more advanced mathematical modeling techniques; and
 extract, based on the modeling:
  a stochastic representation of the one or more contexts of the one or more conversations from the unified dataset,
  a cohesive representation including a temporal information from the one or more contexts of the one or more conversations from the unified dataset, and
  one or more temporal heuristics from the one or more contexts of the one or more conversations from the unified dataset,
 wherein the determination of the one or more contexts of the one or more conversations from the unified dataset is based on the stochastic representation, the cohesive representation including the temporal information, and the one or more temporal heuristics.

4. The system of claim 1, wherein the processor is further configured to:
 train the training model adaptively based on previous conversations; and
 determine one or more misaligned events in the one or more contexts of the one or more conversations from the unified dataset based on the training model.

5. The system of claim 1, wherein the processor is further configured to determine one or more resolution events in the one or more contexts of the one or more conversations from the unified dataset.

6. The system of claim 1, wherein the processor is further configured to:
generate a plurality of events and a plurality of action items including insights;
process the generated plurality of events and the plurality of action items;
generate a plurality of notifications; and
communicate the plurality of notifications through one or more communication channels.

7. The system of claim 1, wherein the processor is further configured to reconstruct one or more sentences from the one or more conversations from the unified dataset.

8. The system of claim 1, wherein the processor is further configured to evaluate confidence of the determination of the one or more conflicts and the one or more conflict resolutions based on the generated one or more tuples.

9. The system of claim 1, wherein the generated one or more tuples represent information corresponding to a determined hypotheses, a first conflict to an existing hypothesis and/or resolution, or a resolution to the existing conflict.

10. A method for managing human interactions, the method comprising:
processing, by a processor, data received from a plurality of data sources;
transforming, by the processor, the processed data into a unified dataset based on one or more properties of one or more data sources of the plurality of data sources;
determining, by the processor, one or more contexts of one or more conversations from the unified dataset;
determining, by the processor, one or more conflicts in the one or more conversations from the unified dataset using a training model,
wherein the one or more conflicts at a time instant corresponds to one or more events in the one or more conversations that are misaligned with a current context of the one or more conversations in the time instant;
generating, by the processor, one or more tuples associated with the determined one or more conflicts in each of the one or more conversations;
determining, by the processor, one or more conflict resolutions for the determined one or more conflicts in each of the one or more conversations from the unified dataset based on the generated one or more tuples;
managing the human interactions, by the processor, based on the determined one or more contexts, the determined one or more conflicts and the determined one or more conflict resolutions;
determining presence of an existing conflict in the one or more conflicts of a specific conversation of the one or more conversations;
generating a nested tuple associated with the specific conversation based on the existing conflict;
determining one or more resolutions based on the generated nested tuple;
determining a pending item based on the determined one or more resolutions; and
communicating the determined pending item to another processor.

11. The method of claim 10, further comprising:
providing, by the processor, an abstraction between the plurality of data sources; and
aggregating, by the processor, the processed data based on the transformation including the one or more properties of the one or more data sources.

12. The method of claim 10, further comprising:
modeling, by the processor, the one or more contexts of the one or more conversations from the unified dataset by one or more advanced mathematical modeling techniques; and
extracting, by the processor, based on the modeling:
a stochastic representation of the one or more contexts of the one or more conversations from the unified dataset,
a cohesive representation including a temporal information from the one or more contexts of the one or more conversations from the unified dataset, and
one or more temporal heuristics from the one or more contexts of the one or more conversations from the unified dataset,
wherein the determination of the one or more contexts of the one or more conversations from the unified dataset is based on the stochastic representation, the cohesive representation including the temporal information and the one or more temporal heuristics.

13. The method of claim 10, further comprising determining, by the processor, one or more misaligned events in the one or more contexts of the one or more conversations from the unified dataset.

14. The method of claim 10, further comprising determining, by the processor, one or more resolution events in the one or more contexts of the one or more conversations from the unified dataset.

15. The method of claim 10, further comprising:
generating, by the processor, a plurality of events and a plurality of action items including insights;
processing, by the processor, the generated plurality of events and the plurality of action items;
generating, by the processor, a plurality of notifications; and
communicating, by the processor, the plurality of notifications through one or more communication channels.

16. The method of claim 10, further comprising reconstructing, by the processor, one or more sentences from the one or more conversations from the unified dataset.

17. A non-transitory computer-readable medium having stored thereon, computer-executable instructions which when executed by a computer cause the computer to execute operations, the operations comprising:
processing data received from a plurality of data sources;
transforming the processed data into a unified dataset based on one or more properties of one or more data sources of the plurality of data sources;
determining one or more contexts of one or more conversations from the unified dataset;
determining one or more conflicts in the one or more conversations from the unified dataset,
wherein the one or more conflicts at a time instant corresponds to one or more events in the one or more conversations that are misaligned with a current context of the one or more conversations in the time instant;
generating one or more tuples associated with the determined one or more conflicts in each of the one or more conversations;
determining one or more conflict resolutions, for the determined one or more conflicts in each of the one or more conversations from the unified dataset based on the generated one or more tuples;

managing human interactions based on the determined one or more contexts, the determined one or more conflicts and the determined one or more conflict resolutions;

determining presence of an existing conflict in the one or more conflicts of a specific conversation of the one or more conversations;

generating a nested tuple associated with the specific conversation based on the existing conflict;

determining one or more resolutions based on the generated nested tuple;

determining a pending item based on the determined one or more resolutions; and communicating the determined pending item to another processor.

18. The non-transitory computer-readable medium of claim 17, the operations further comprising:

providing an abstraction between the plurality of data sources; and aggregating the processed data based on the transformation including the one or more properties of the one or more data sources.

19. The non-transitory computer-readable medium of claim 17, the operations further comprising:

modeling the one or more contexts of the one or more conversations from the unified dataset by one or more advanced mathematical modeling techniques; and extracting, based on the modeling:

a stochastic representation of the one or more contexts of the one or more conversations from the unified dataset, a cohesive representation including a temporal information from the one or more contexts of the one or more conversations from the unified dataset, and one or more temporal heuristics from the one or more contexts of the one or more conversations from the unified dataset, wherein the determination of the one or more contexts of the one or more conversations from the unified dataset is based on the stochastic representation, the cohesive representation including the temporal information and the one or more temporal heuristics.

20. The non-transitory computer-readable medium of claim 17, the operations further comprising determining one or more misaligned events in the one or more contexts of the one or more conversations from the unified dataset.

21. The non-transitory computer-readable medium of claim 17, the operations further comprising determining one or more resolution events in the one or more contexts of the one or more conversations from the unified dataset.

22. The non-transitory computer-readable medium of claim 17, the operations further comprising:

generating a plurality of events and a plurality of action items including insights;

processing the generated plurality of events and the plurality of action items;

generating a plurality of notifications; and communicating the plurality of notifications through one or more communication channels.

* * * * *